(12) United States Patent
Amir et al.

(10) Patent No.: US 7,921,445 B2
(45) Date of Patent: Apr. 5, 2011

(54) AUDIO/VIDEO SPEEDUP SYSTEM AND METHOD IN A SERVER-CLIENT STREAMING ARCHITECTURE

(75) Inventors: Arnon Amir, Saratoga, CA (US); Malcolm Slaney, San Jose, CA (US)

(73) Assignee: International Business Machines Corporation, Armok, NY (US)

( * ) Notice: Subject to any disclaimer, the term of this patent is extended or adjusted under 35 U.S.C. 154(b) by 1533 days.

(21) Appl. No.: 10/165,308

(22) Filed: Jun. 6, 2002

(65) Prior Publication Data

US 2003/0229901 A1    Dec. 11, 2003

(51) Int. Cl.
*H04N 7/173* (2006.01)

(52) U.S. Cl. .............. 725/88; 725/86; 725/87; 725/101; 725/102

(58) Field of Classification Search .................. 725/86, 725/87, 88, 101, 102
See application file for complete search history.

(56) References Cited

U.S. PATENT DOCUMENTS

| | | | | |
|---|---|---|---|---|
| 5,148,487 A * | 9/1992 | Nagai et al. | ................... | 704/265 |
| 5,583,652 A | 12/1996 | Ware | ............... | 386/75 |
| 5,664,044 A | 9/1997 | Ware | ............... | 386/104 |
| 5,828,994 A * | 10/1998 | Covell et al. | ................ | 704/211 |
| 5,828,995 A * | 10/1998 | Satyamurti et al. | ......... | 358/1.18 |
| 5,848,239 A * | 12/1998 | Ando | ............... | 709/203 |
| 5,987,407 A * | 11/1999 | Wu et al. | ................... | 704/200.1 |
| 6,028,608 A | 2/2000 | Jenkins | ......................... | 345/422 |
| 6,104,706 A | 8/2000 | Richter et al. | ................ | 370/263 |
| 6,108,448 A | 8/2000 | Song et al. | ................ | 382/235 |
| 6,115,070 A | 9/2000 | Song et al. | ................ | 348/402 |
| 6,173,255 B1 | 1/2001 | Wilson et al. | ................ | 704/216 |
| 6,233,017 B1 | 5/2001 | Chaddha | ................... | 348/412 |
| 6,314,576 B1 * | 11/2001 | Asamizuya et al. | ........... | 725/91 |
| 6,470,310 B1 * | 10/2002 | Oshikiri et al. | ................ | 704/207 |
| 6,598,228 B2 * | 7/2003 | Hejna, Jr. | ......................... | 725/91 |
| 6,637,031 B1 * | 10/2003 | Chou | ............... | 725/87 |
| 7,016,850 B1 * | 3/2006 | Cox et al. | ................ | 704/503 |
| 7,050,492 B1 * | 5/2006 | Fenne | ........................... | 375/240 |

(Continued)

FOREIGN PATENT DOCUMENTS

WO   WO 00/16533   3/2000

(Continued)

OTHER PUBLICATIONS

Malah, "Time Domain Algorithms for Harmonic Bandwidth Reduction and Time Scaling of Speech Signals," IEEE Transactions on Acoustics, Speech, and Signal Processing, vol. ASSP-27, No. 2, Apr. 1979, pp. 121-133.

(Continued)

*Primary Examiner* — Brian T Pendleton
*Assistant Examiner* — Jason K Lin
(74) *Attorney, Agent, or Firm* — Cantor Colburn LLP

(57) ABSTRACT

A system and a corresponding method for temporal modification of audio signals, to increase or reduce the playback rates of an audio and/or a video file in a client-server environment. The system and method improve the efficiency of serving streaming media to a client so that the client can select an arbitrary time-speedup factor. The speedup system performs many of the pre-calculations once, at the server, so that the bandwidth needs are reduced and the client's computational load is minimized. The final time-scale-modification can be either done completely on the server, thus reducing the client's needs, or partly on the client's computer to minimize latency, and to reduce on-the-fly computational load from the server that serves multiple clients concurrently.

28 Claims, 13 Drawing Sheets

U.S. PATENT DOCUMENTS

| | | | |
|---|---|---|---|
| 7,159,233 B2 * | 1/2007 | Son et al. | 725/86 |
| 2003/0163824 A1 * | 8/2003 | Gordon et al. | 725/90 |
| 2004/0064576 A1 * | 4/2004 | Goldhor et al. | 709/232 |
| 2004/0064579 A1 * | 4/2004 | Jennings | 709/238 |
| 2004/0125878 A1 * | 7/2004 | Liljeryd et al. | 375/242 |
| 2005/0131683 A1 * | 6/2005 | Covell et al. | 704/230 |

FOREIGN PATENT DOCUMENTS

| WO | WO 01/25090 | 6/2001 |
|---|---|---|

OTHER PUBLICATIONS

Covell et al., "Fast MPEG: time-scale modification of audio in the bit-rate-compressed domain," available on the Internet at URL http://www.slaney.org./covell/fastmpeg, downloaded on Jun. 6, 2002.

Sun et al., "Recording the Region of Interest From Flycam Panoramic Video," IEEE Publication, 2001, pp. 409-412.

Amir et al. "Using Audio Time Scale Modification for Video Browsing," IEEE Publication, 2000, pp. 1-10.

MPEG Video Compression Standard, Edited by Joan L. Mitchell, W. B. Pennebaker, C. E. Fogg and D. J. LeGall, Chapman & Hall, Int. Thomson publishing, Chapter 8, 1997.

Moulines et al., "Non-parametric techniques for pitch-scale and time-scale modification of speech," Elsevier, Speech Communication 16 (1995), pp. 175-205.

Omoigui et al., "Time-Compression: Systems Concerns, Usage, and Benefits," Microsoft Research, 1999.

Standard, ISO/IEC 11172-3: 1993.

* cited by examiner

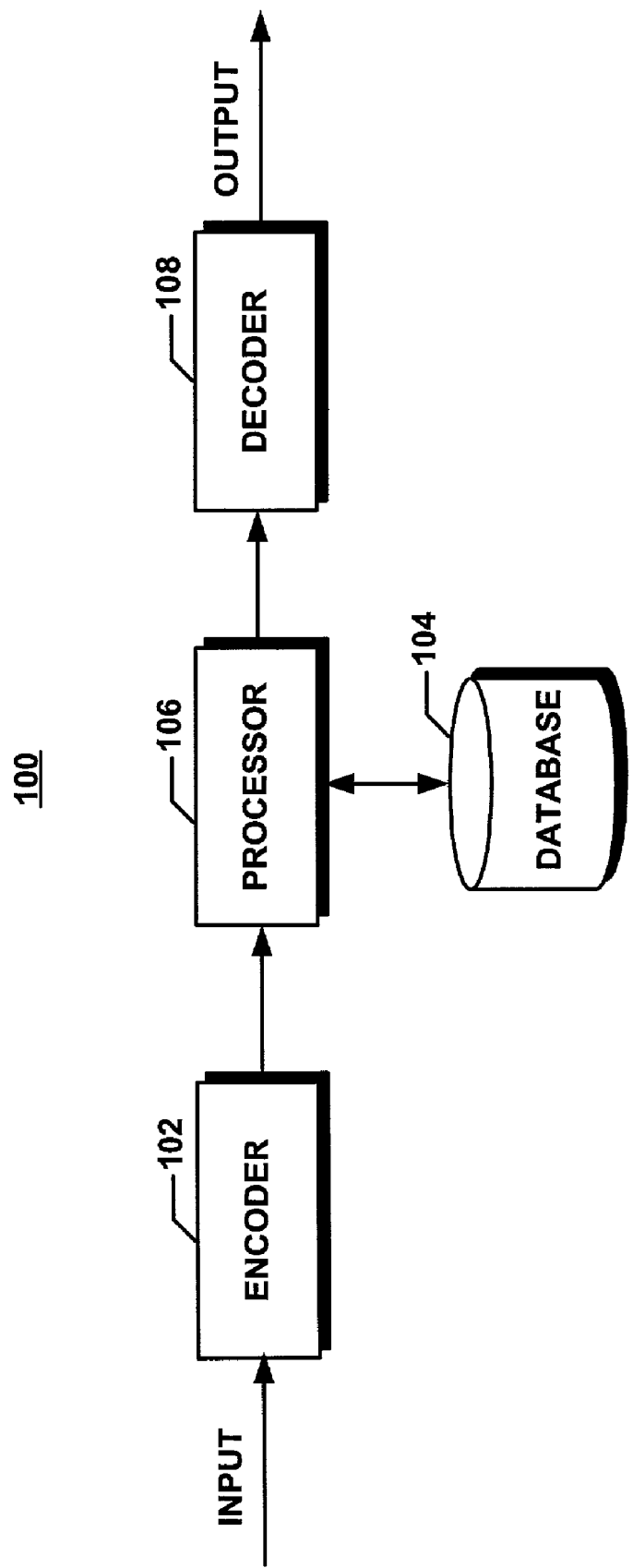

LOWER-LEFT ENCODING

LOWER-RIGHT ENCODING

UPPER-LEFT ENCODING

UPPER-RIGHT ENCODING

AUDIO/VIDEO SPEEDUP SYSTEM AND METHOD IN A SERVER-CLIENT STREAMING ARCHITECTURE

FIELD OF THE INVENTION

The present invention relates in general to a system and method for temporal modification of audio and/or video signals, to increase or reduce the playback rate of an audio and/or a video file being streamed in a compressed format in a client-server environment.

BACKGROUND OF THE INVENTION

Recent years have witnessed major advances in the field of computer systems technologies, along with the major breakthroughs in the hardware field such as in the design of microprocessors, memory, and data transfer bus. These advances in technologies along with the fierce competition in the free marketplace have reduced the price of computing, and made it affordable to the masses. Electronic computing is no longer reserved for large companies, maintaining customers' accounts in banks, or performing theoretical or engineering research.

The computing power is no longer centralized in a central mainframe, and the clients (or clients' processors) are no longer the dumb terminals they used to be, whose only function was to submit jobs to be processed at the central host. Nowadays, the personal computer, or PC, is a rich machine that can be both a client and or a host, and is becoming very affordable.

From universities to corporations, many businesses are now making digital media content, such as training courses or seminars, available online. With so much content available, it is increasingly desirable to be able to skim and browse the digital content quickly and accurately.

Digital content in multimedia files could be compressed in a variety of available compression formats. In addition, several implementations have been proposed to speed up the playback rates of digital audio. However, there is no adequate method for speedup of compressed audio files for streaming.

Two models have been proposed. One model is to precompute and store the stream in several speedup ratios. This model requires that the server maintain multiple time-compressed versions of the same digital file depending on the speedup factor for example: 1.0, 1.25, 1.5, 2.0, etc. The client will then choose the version of his/her choice at playback time. This method requires no real-time computations and only the standard bit rate is sent over the communication line. However, it just provides a fixed predetermined set of speedup ratios from which to choose. A principal disadvantage of this method is the additional storage required to store several versions of the stream for each speedup ratio. This method does not require significant computational power on the client.

Another implementation requires a real-time client audio speedup computation. In this model, the server accepts speedup factor requests from the client. The server then streams the data at n times faster than the original playback rate, n being the speedup factor, and the client's processor (also referred to herein as "client") computes the audio speedup on the fly. This implementation does not require additional storage on the server, as in the previous model. However, this implementation overloads both the client's machine and the network because it requires:

A) the client's machine to decode the data at this faster rate and to compute the modified sped-up version for playback; and
B) additional network bandwidth, which affects the overall network performance, since the server must send more data even faster over overloaded communications network.

Another exemplary conventional system does many of these calculations, in relation to TSM of recompressed files and not streaming media. Yet another conventional system describes the advantages and needs for TSM in streaming media using precomputed streams in various speedup ratios and using networked file systems to pass the streams from the server to the client.

Subsequently, upon demand from the viewer, the file is retrieved and decompressed for playback. A variety of techniques may be employed to effect the compression and expansion of audio signal so that it can be played back over periods of time that are different than the period over which it was recorded. One of the earliest examples of audio speedup is the "fast playback" approach. In this approach, a recorded audio signal is reproduced at a higher rate by speeding up an analog waveform, e.g., transporting a magnetic tape at a faster speed during playback than the recording speed.

However, this approach shifts the pitch of the reproduced sound. For instance, as the playback rate is increased, the pitch shifts to a higher frequency, giving speech a "squeaky" characteristic.

Another approach is known as "snippet omission," that alternately maintains and discards short groups of samples, and abutting the retained samples. The snippet omission approach has an advantage over the fast playback approach, in that it does not shift the pitch of the original input signal. However, it does result in the removal of energy from the signal, and offsets some of the signal energy in the frequency domain according to the lengths of the omitted snippets, resulting in an artifact that is perceived as a discernable buzzing sound during playback.

More recently, an approach known as Synchronous Overlap-Add (SOLA) has been developed, which overcomes the undesirable effects associated with each of the two earlier approaches. In essence, SOLA constitutes an improvement on the snippet omission approach, by linking the duration of the segments that are played or skipped to the pitch period of the audio, and by replacing the simple splicing of snippets with cross-fading, i.e., adjacent groups of samples are overlapped. Detailed information regarding the SOLA approach can be found in the paper by Roucous & Wilgus entitled "High Quality Time-Scale Modification for Speech," IEEE International Conference on Acoustics, Speech and Signal Processing, Tampa, Fla., volume 2, pages 493-496 (1985). The SOLA approach does not result in pitch shifting, and reduces the audible artifacts associated with snippet omission.

Digital audio files are now being used in a large number of different applications, and are being distributed through a variety of different channels. To reduce the storage and transmission bandwidth requirements for these files, it is quite common to compress the data. For example, a common form of compression is based upon the MPEG audio standard. Some applications that are designed to handle audio files, compressed according to this standard, may include dedicated decompression hardware for playback of the audio.

In a conventional compression system, when an incoming audio/video (AV) signal is recorded for later viewing, it is fed to a compressor or encoder that digitizes the input (or incoming) signal if it is not already in a compressed format, according to any suitable compression technique, such as MPEG. The compressed AV signal is stored as a file or a stream.

In one conventional system, a system precomputes several time-compressed streams and lets the user switch between them. It considers the tradeoff between the two naïve approaches: having multiple streams on the server versus streaming it all and computing everything on the client. It further considers the Time Scale Modification (TSM) usage patterns by users in a user study. The present invention overcomes this tradeoff by being more flexible, saving on both bit rate and computational effort, and requiring much less storage.

There is therefore an unfulfilled need for a system and method that implement audio speedup, while concurrently reducing the computational load on the client, reducing the bandwidth overload on the network, and reducing the storage and computation needs by the simultaneous implementation of several computations. It would be desirable to pre-compute as much of the signal as possible. When the user requests an audio speed change or a portion of a panoramic image, all but the final audio or image processing work is done so that the new media can be presented to the user with minimal network and computational load.

SUMMARY OF THE INVENTION

It is one feature of the invention to present a system and method for temporal modification of audio signals that have already been compressed, in order to increase or reduce the playback rates of an audio file in a client-server environment.

The system and method of the present invention improve the efficiency of serving streaming media to a client so that the client can select an arbitrary time-speedup factor. The system and method of the present invention address the following two problems:

1. Reduce computational load on the client for computing the speedup audio.
2. Reduce the number of bits that need to be transmitted over the communication network. As an example, in a conventional solution if a user wishes to speed up the audio playback by a factor of two, the client would need to receive the data at twice the bit rate than the original bit rate. This could significantly overload the network connection, and, some instances, it could even prevent the desired fast playback.
3. Reduce the storage that would be required to store multiple compressed copies of the audio at different speedup ratios on the server.
4. Keep the new media format backward compatible with old player versions that do not support it. Backwards compatibility is a major concern in products, and thus it will be beneficial to all to use an implementation that provides backwards compatibility.
5. Make speedup playback of local files more efficient. Although the preferred embodiment has a server and a client connected through a network, the same method of pre-computing additional information and storing it along with the audio data can be beneficial even when no server-client connection is present. For example, when the media is stored as a file on a storage device, such as a disk drive or flash memory, for later playback.
6. Audio speedup pre-computation in hardware, firmware, and other programmable devices. In particular, the time scale modification pre-computation can be implemented into an MPEG encoder, producing an enriched MPEG audio stream that supports speedup playback.
7. Enables reverse speech playback: Reverse speech playback is implemented for example in the Apple Quick-Time ® player. It plays the words in reverse order, but each word is played forward, so the words sound natural. This process can be partially computed off-line to find the words begin and end times. The times are stored with the stream. In reverse playback time, the stream packets are reorganized. The packets which correspond to one word are grouped into a single segment. The segments are streamed in reverse order.

The present invention offers a method of performing many of the calculations once, at the server, so that the bandwidth needs are reduced and the client's computational load is minimized. This computation applies to any speedup ratio and is only done once. The final time-scale-modification is done when the user specifies the desired setup ratio. It can be either done completely on the server, thus reducing the client's needs, or partly on the client's computer to minimize latency, and to reduce on the computational load on a server that serves multiple clients concurrently.

Though the present invention will be primarily described in terms of audio speedup and/or slowdown, it should be understood that the concept of the present invention may be applicable to video signals as well. In a more general view, the present invention applies to almost any application that processes streaming media, when the process depends on one or more parameters which are only determined during the streaming and playback time.

In some cases, the additional information that needs to be streamed to the client in order to finish its part of the calculation can be packed as a separate track and streamed synchronously to the AV streams using standard technology, like Quicktime® or SMIL. In certain implementations, this would also allow an old version client that is not aware of the new technology to still play something of the audio stream, that is the audio stream will be compatible with standard audio, just that without the additional computation it might sounds funny, or with degraded quality. Backwards compatibility is a major concern in products, and thus it will be beneficial to all to use an implementation that provides backwards compatibility.

In even more general context, this patent provides a means to split an algorithm that processes a stream and requires one or more parameters at the time the stream is consumed by the user via a client. Some parts of the calculation can be done once, independent of the unknown parameters, and their results saved so that the calculations need not be repeated. The rest of the computation is carried out during the stream consumption time, after the required parameters have been made available to the process.

In general, the system and method of the present invention separate the computations into two parts. The first computational process is performed once on the server, with the results being stored on a storage medium. This computation will fit any specified user parameters, such as any speedup ratio, to increase or reduce the playback rates. However, in absence of actual desired speedup ratio, the result is not necessarily a ready-to-play signal.

The second computational process depends on the user's preferences, and is performed on a per-session basis, on the client's side, not to overload the server with running multiple instances of the audio file for all the clients. If the server can efficiently provide the partial results to the client, then the overall "price" of this service is reduced relative to the previous computational schemes.

BRIEF DESCRIPTION OF THE DRAWINGS

The above and further objects, features and advantages of the invention will become clearer from the more detailed description read in conjunction with the following drawings, in which:

FIG. 2 is a block diagram of the main components of a digital audio/video compression system that incorporates the AV speedup system and method of FIG. 1;

DETAILED DESCRIPTION OF PREFERRED EMBODIMENTS

Figure 1:
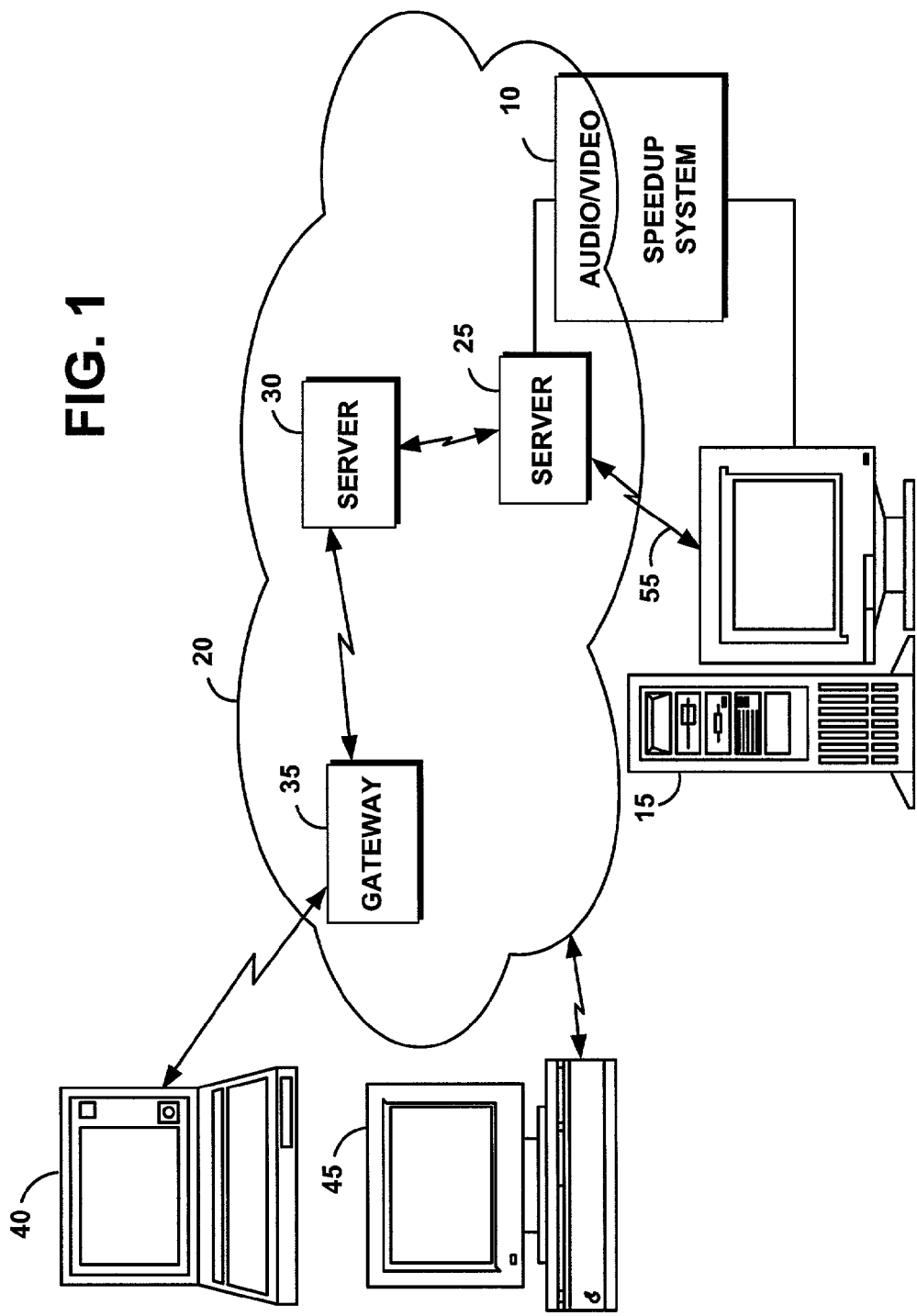
FIG. 1 is a schematic illustration of an exemplary operating environment in which an audio/video (AV) speedup system and method may be used according to the present invention.

FIG. 1 portrays an exemplary environment in which an audio/video (AV) speedup system and method of the present invention may be used to temporally modify a compressed audio/video waveform. The speedup system 10 includes a software or computer program product that is typically embedded within or installed on a client end server 15 and/or a host server 25. Alternatively, the system 10 can be saved on a suitable storage medium such as a diskette, a CD, or hard drive, or like devices. While the present invention will be described in terms of audio signals or files, it should be clear that the system 10 and associated method may be used to process video signals or files as well, without departing from the scope of the present invention.

The cloud-like communication network 20 is comprised of communication lines and switches connecting servers such as servers 25, 30 to gateways such as gateway 35. The servers 25, 30 and the gateway 35 provide the communication access to the Internet. Other types of communication networks, including Intranet, cable networks, smoke signals, wire-based and wireless based networks can also be used. Users, such as clients or other remote Internet users are represented by a variety of computers such as computers 40, 45. The host server 15 is connected to the network 20 via a communications link 55 such as a telephone, cable, or satellite link. The servers 25, 30 can be connected via high speed Internet network lines, or other lines and networks to other computers and gateways.

FIG. 2 illustrates an audio compression/decompression system 100 incorporated in the speedup system 10 of FIG. 1. An incoming audio video (AV) signal is fed to an encoder 102 that digitizes the signal and compresses it according to any suitable compression technique, such as MPEG.

The compressed signal may be stored as a digital file in a suitable storage medium 104. Subsequently, the file is retrieved from the storage medium 104, and provided to a decoder 108, where the output file is restored to its original signal (i.e., the input signal).

Figure 14:
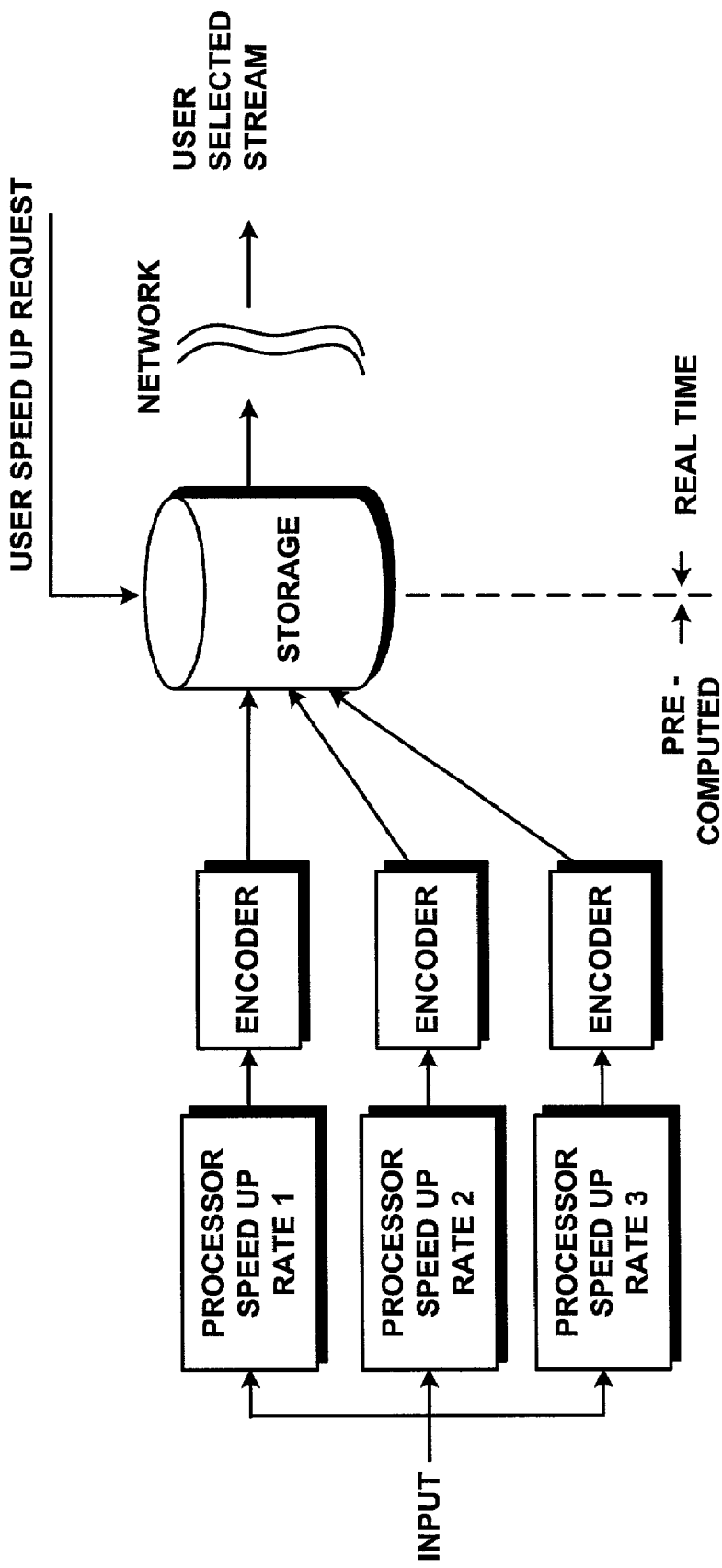
FIG. 14 represents a prior art naive method to compute server-client audio speedup by storing multiple copies of the stream at pre-specified speed up ratios.

FIG. 14 shows a prior art system 100 for audio speedup. The input audio signal is pre-processed at one or more speedup rates by a plurality of processors such 112, 114, 116. The resulting pre-processed signals are encoded by a plurality of encoders, i.e., 118, 120, 122, and stored in a storage device 124. At playback time the client requests one of the stored speedup signals and that stream is delivered to the client over the network.

This method does not require real-time audio speedup computation on either the server's side or the client's side. It only requires a standard streaming bit-rate. However, the method satisfies only a fixed set of precomputed speed up rates, and it requires that the server store multiple versions of the same stream at multiple rates, thus increasing the storage requirements and costs.

Figure 15:
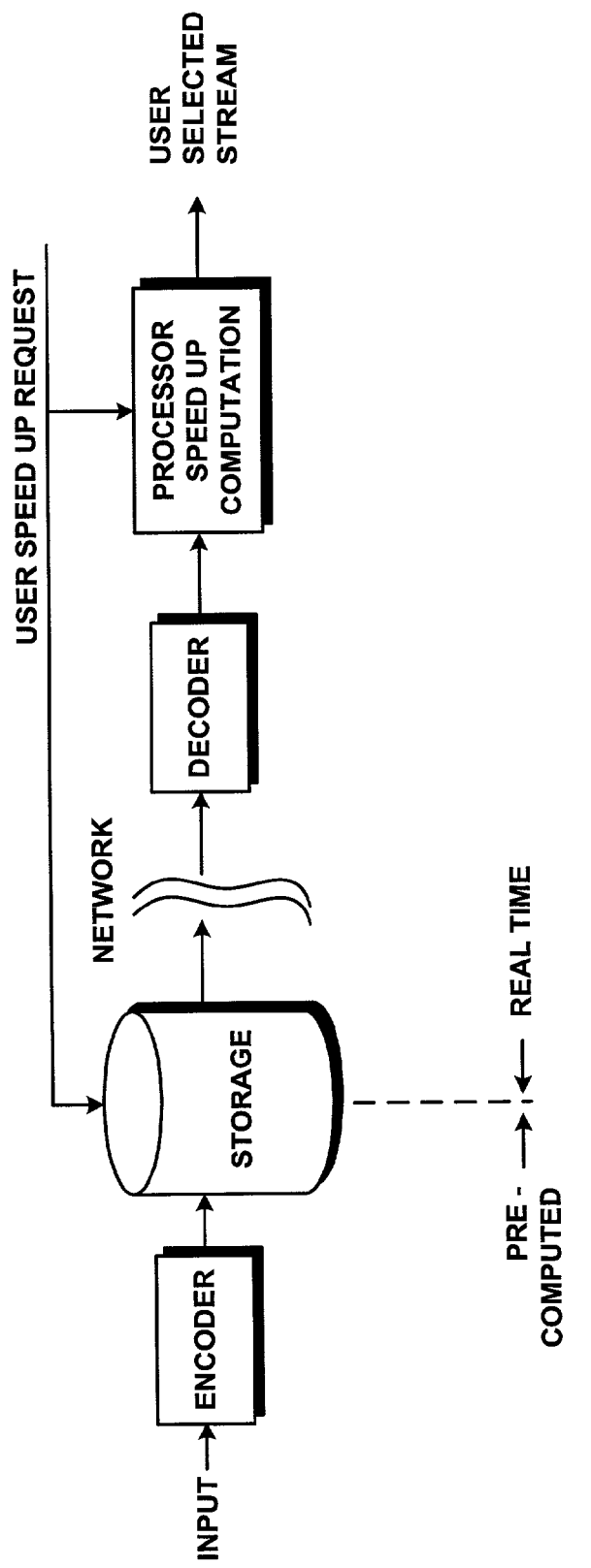
FIG. 15 represents a second prior art naive method to compute server-client audio speedup by storing only the original stream, and during playback time streaming it n times faster, wherein the audio speedup is computed on the client's side.

FIG. 15 shows another prior art system 125. The audio signal is stored at its original speed (the speed up rate is 1.0). At playback time the user requests a different speed-up ratio. The audio signal is then streamed at a faster bit rate over the network to the client. The client processes the audio signal, applies an audio speed up algorithm, computes the speedup version, and plays the audio signal.

This method does not require additional storage, and supports almost any speed up ratio. However, it requires streaming at a faster bit rate, thus overloading the network and the streaming server, which supports multiple clients simultaneously. Further, since each client applies the processing to the audio, the system 125 requires that the server have sufficient computational power to support this operation in real-time. This computation is repeated by each client, resulting in overall network inefficiency and additional computation. This is in particular noteworthy when the client is a light-weight carried device, connecting to the server via a wireless communication network. In such a device, the system 125 would result in higher power consumption of the device, shortening its battery lifetime.

Figure 2A:
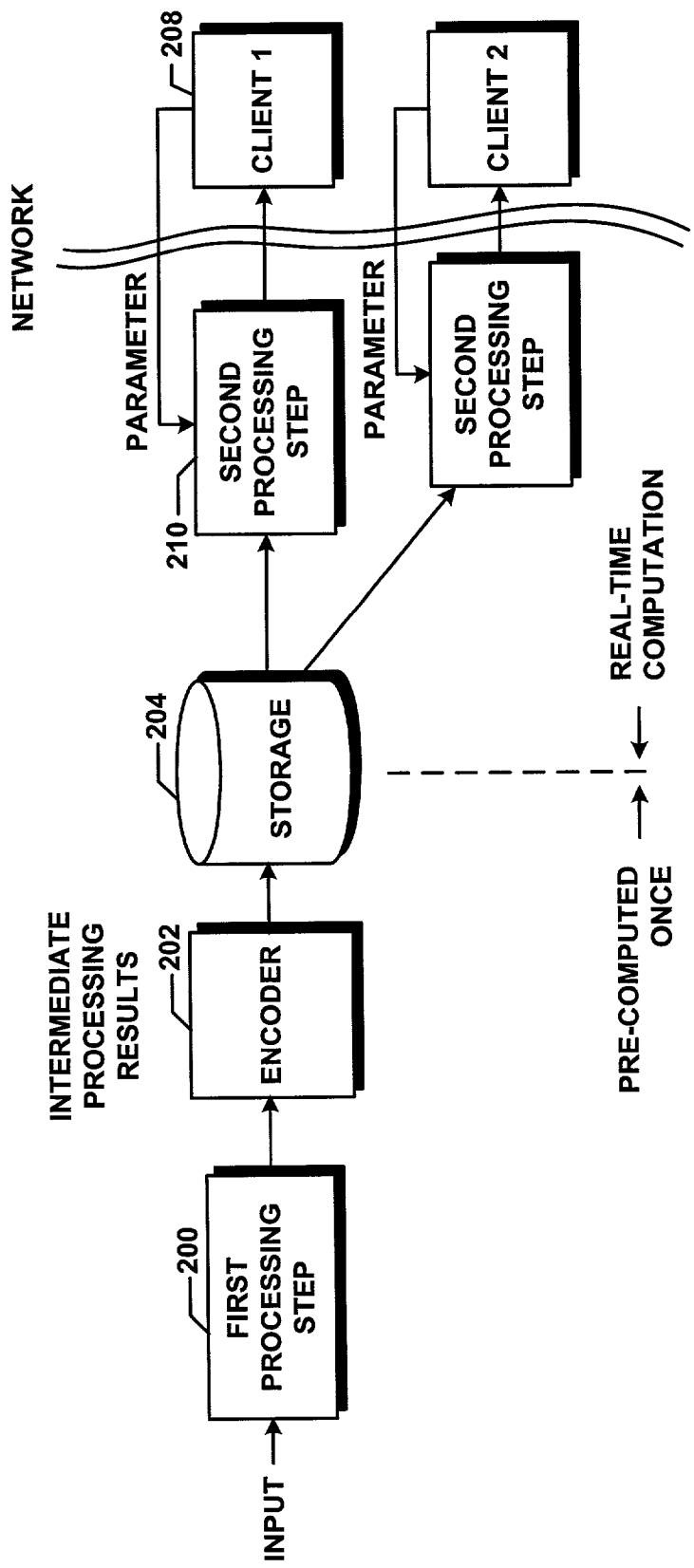
FIG. 2A is an alternative block diagram of a digital audio/video compression system that incorporates the AV speedup system and method of FIG. 1, wherein encoding is done after the storage.

FIG. 2A is a high level representation of the system 10, wherein the input media signal is processed, at a first processing step 200, and then encoded by an encoder 202 to generate an intermediate representation of the input media signal, independent of the client-specified parameter. The intermediate representation is stored or saved on an appropriate medium 204. When a client-specified parameter or request from a representative client 208 is received, it is conveyed to a second processing step 210 where it is processed and then sent to the client 208.

Figure 2B:
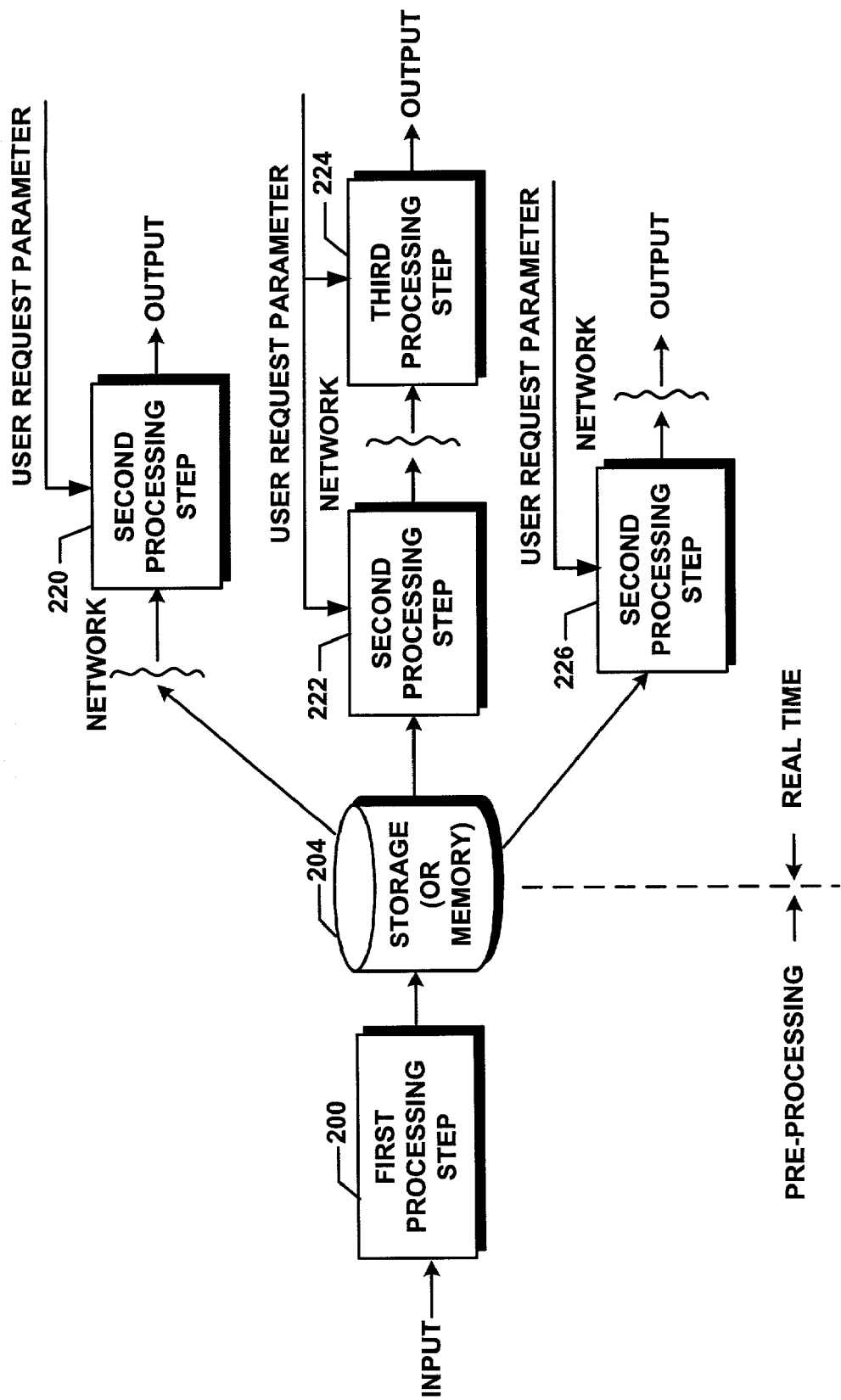
FIG. 2B is another alternative block diagram of a digital audio/video compression system that incorporates the AV speedup system and method of FIG. 1, illustrating three possible ways to share the second processing function between a server and a client.

FIG. 2B is another high level representation a digital audio/video compression system 10 that incorporates the AV speedup system 10 of FIG. 1, illustrating three possible ways to share the second processing function between a server and a client. Similarly to FIG. 2A, the input media signal is processed, at a first processing step 200, and an intermediate representation of the input media signal is generated independent of the client-specified parameter. The intermediate representation is stored or saved on an appropriate medium 204.

According to a first embodiment, when the client-specified parameter or request is received by system 10, the stored intermediate representation is conveyed, over the network, to a second processing step 220, for processing by the client.

According to a second embodiment, when the client-specified parameter or request is received by system 10, the stored intermediate representation is conveyed to a second processing step 222 for partial processing, and then transmitted over the network to a third processing step 224 for final processing by the client.

According to a third embodiment, when the client-specified parameter or request is received by system 10, the stored intermediate representation is conveyed to a second processing step 226 for full processing, and then transmitted over the network to the client.

It should be clear that the second processing steps 220, 222, 226 can be implemented by more than one server. Similarly, it should be clear that the third processing step 224 could be implemented by more than one client.

Figure 3:
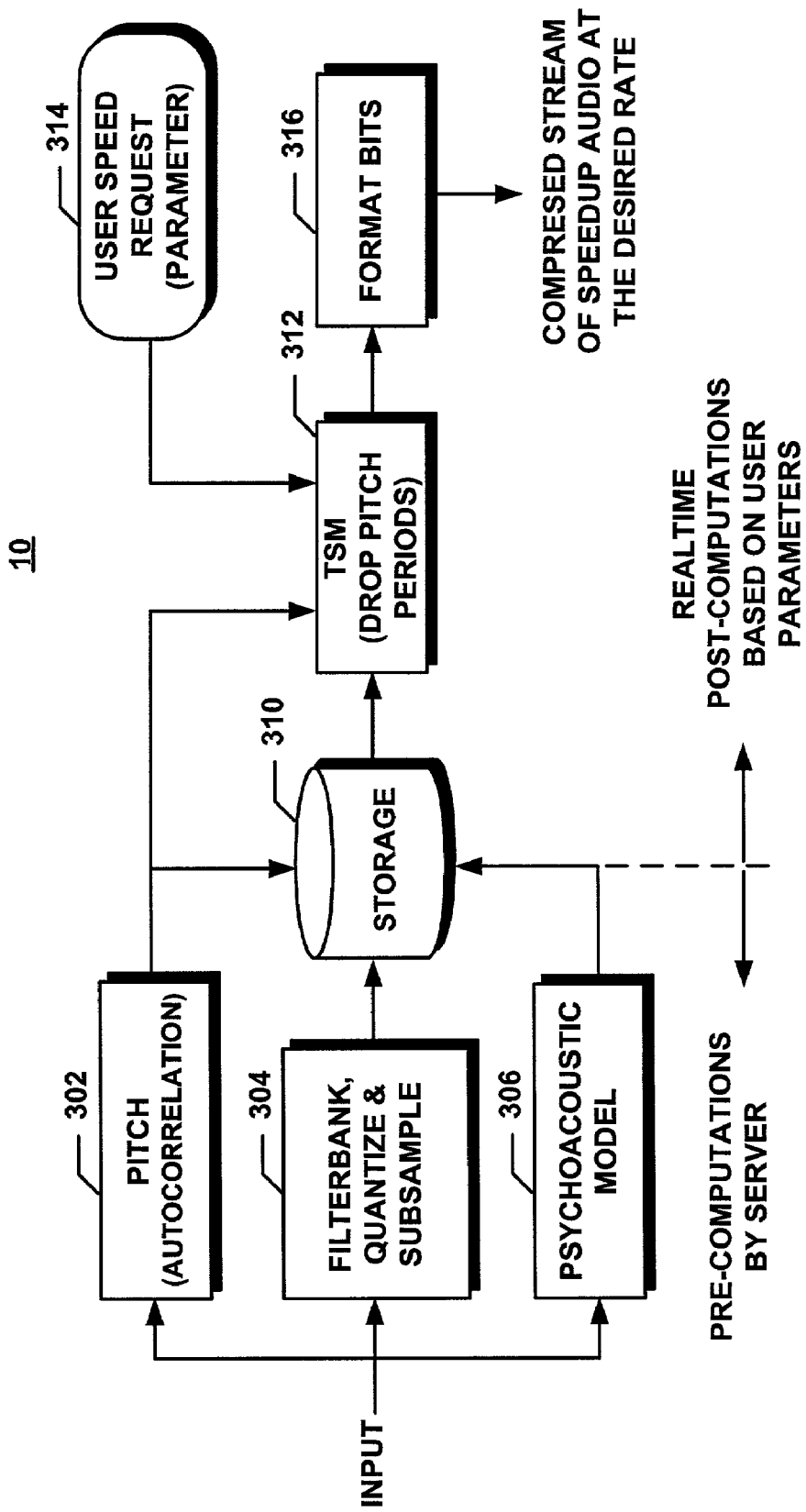
FIG. 3 is a block diagram of the speedup system of FIG. 1.

FIG. 3 is a block diagram of the speedup system 10 of FIG. 2, and illustrates the speedup split from the server to the client. In general, the system 10 performs time-scale modification (TSM) of streaming audio (and/or video) signals by executing as many pre-calculations as possible, once, at the server level. The rest of the computation is performed at playback time, either on the server and/or on the client. Solely for the convenience of explanation and illustration, the speedup system 10 will now be described in terms of a specific example.

For a better appreciation of the present invention, a brief overview of audio data encoder 102 will now be provided. MPEG compression is commonly employed for the compression of audio files that are transmitted over the Internet and/or utilized in disk-based media applications. An audio input signal is fed to a filter bank that divides the audio signal into a number of sub-bands in the MPEG format.

A filter bank 304 in FIG. 3 provides a time-to-frequency mapping of the audio signal for the particular range of frequencies associated with the sub-band of the filter bank 304. The filter bank 304 produces sub-band filtered output streams of audio samples. The audio samples can be sub-sampled and grouped into frames to form transmission packets.

MPEG compression is commonly employed for the compression of audio files that are transmitted over the Internet and/or utilized in disk-based media applications. An audio signal that may contain speech, music, sound effects, and/or other signals, is fed to a filter bank 304. This filter bank 304 divides the audio signal into a number of sub-bands, i.e., 32 sub-bands in the MPEG format. Each of the filters in the filter bank 304 samples the audio signal at the designated sampling rate, and implements a band-pass filter at a different frequency sub-band, to provide a time-to-frequency mapping of the audio signal for the particular range of frequencies. Additional details about the MPEG audio can be found in ISO11EC JTC1, 1993, "Information Technology-Coding of Moving Pictures and Associated Audio for Digital Storage Media at up to about 1.5 Mbits/sec," Port 3:Audio, Technical Corrigendum 1, Int. Standard ISO/ISEC 11172-3, pp 46-49."

The filter bank 304 produces thirty-two sub-band output streams of audio samples that can be sub-sampled, for example by a factor of thirty-two to provide thirty maximally-decimated sub-band streams (MDSS). The samples in each of these streams are then grouped into frames to form transmission packets. If another compression technique is employed, the number of sub-bands and/or the number of samples per packet may be different.

Figure 4:
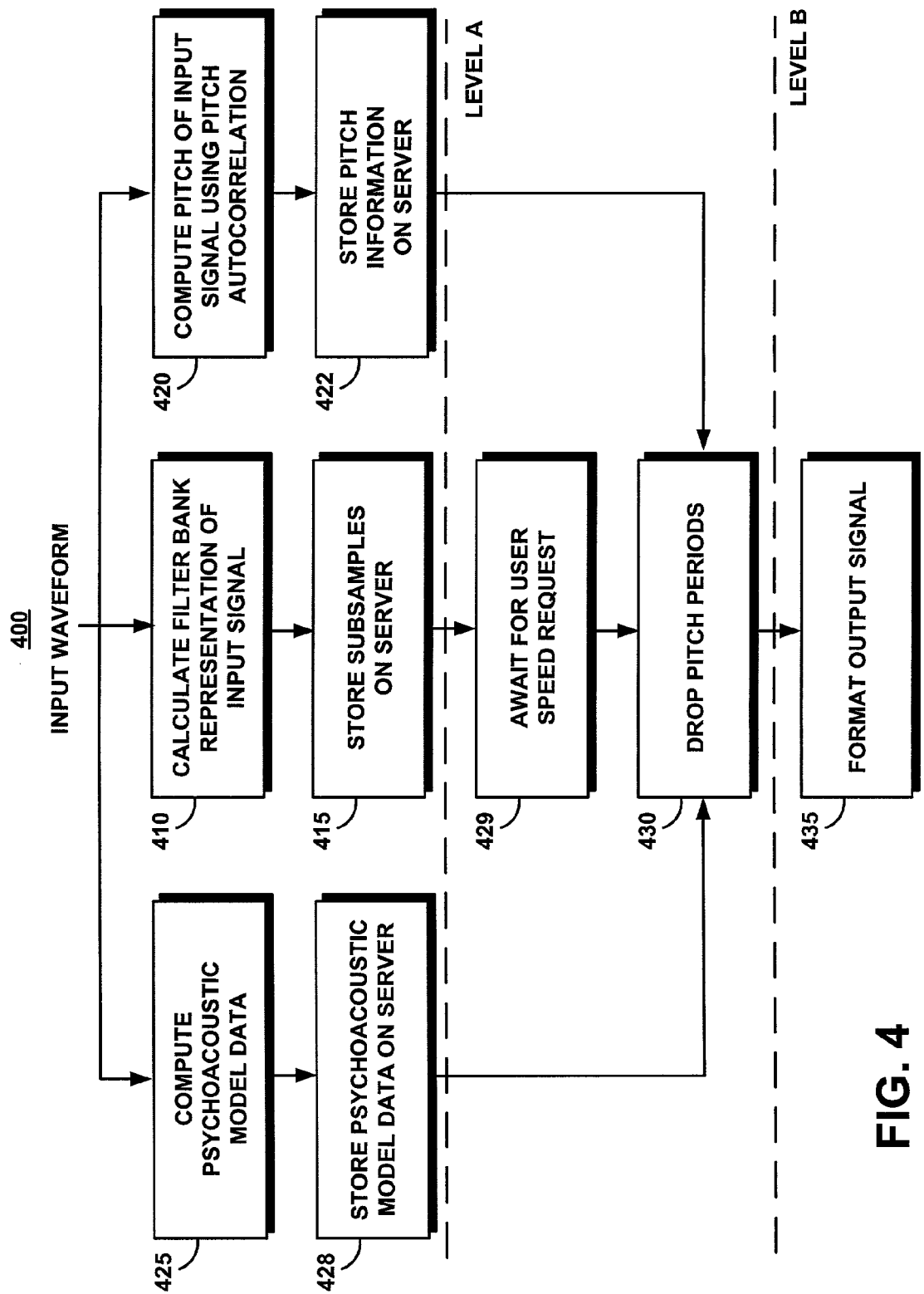
FIG. 4 is a process flow chart illustrating a method implemented by the speedup system of FIG. 3, to temporally modify a compressed audio/video waveform.

FIG. 4 illustrates a method 400 implemented by the speedup system 10 of FIG. 3, to temporally modify a compressed audio/video waveform (or input signal). Method 400 starts at step 410 by calculating a filter bank representation (critically sub-sampled) of the input signal, as described above in connection with FIG. 3. Method 400 then stores the filter bank samples in a data storage 310, such as on the server 15 (FIG. 1) at step 415. The filter bank output representation can be quantised, based on a psychoacoustic model calculated from the applied input signal, to save storage space.

Concurrently or sequentially with steps 410 and 415, the server 15 computes the pitch 302 of the input signal using, for example, pitch autocorrelation, at step 420. Pitch autocorrelation technique is known in the field For more details see "Pitch Determination of Speech Signals: Algorithms and Devices by Wolfgang Hess, Springer Verlag; ISBN: 0387119337; (April 1983). Method 400 then stores the input signal timely pitch information in data storage 310 at step 422.

Autocorrelation generates a peak at the pitch period. The first peak of the autocorrelation provides a good estimate of the periodicity of the signal, without introducing a large snippet length during which the signal might be changing. Upon receiving two packets and undoing their scaling and quantization, method 400 checks which MDSS has the maximum energy across the two input packets, and uses that MDSS to determine the correct snippet length (Reference is made, for example, to PCT application WO01/45090A1). As such, the lengths of the omitted portions of the signal are dynamically adjusted in accordance with the content of the signal. The output signal will be constructed by taking small sections of the input (in milliseconds) from different time points, and cross-fading (i.e., overlapping) them together.

Concurrently or sequentially with steps 410, 415, and/or 420, the server 15 computes a psychoacoustic model 306 (FIG. 3) at step 425 of FIG. 4, to determine the number of bits to allocate to each sub-band. The psychoacoustic model 306 is used to determine the mastery level of the audio as a function of time and frequency in the input signal, and to predict the amount of quantization noise in each frequency band that is masked by the signal content. By using the psychoacoustic model 306, the speedup system 10 maintains the perceived quality of the audio signal as high as possible for the given number of bits used to encode it. Method 400 then tabulates the number of bits with the associated sub-bands, and stores this information in data storage 310, at step 428.

With the foregoing pre-calculated data stored in storage device 310 (FIG. 3) as an intermediate file, system 10 (FIG. 1) waits for the receipt of a user's control parameter, such as a speed factor request 314, at step 429 of FIG. 4. For illustration purpose only, a received speed factor 314 of 1.5 means that for every three pitch periods of audio data, the speedup system 10 discards one of the periods. When the user specifies the speed factor, system 10 can readily identify which part of the audio signal to drop since it has already precomputed the pitch via autocorrelation. Knowing the pitch, system 10 can readily compute the samples 312 (FIG. 3) to drop at step 430 of FIG. 4, for any arbitrary speedup factor.

The output signal is formatted at step 435 of FIG. 3, into a stream of formatted packets or bits 316, for transmission to the client. The client's decoder 108 (FIG. 2) receives and decodes the stream. Note that network connection can be at level A or level B; with B having a lower latency, but larger client computational requirements than A.

Figure 5:
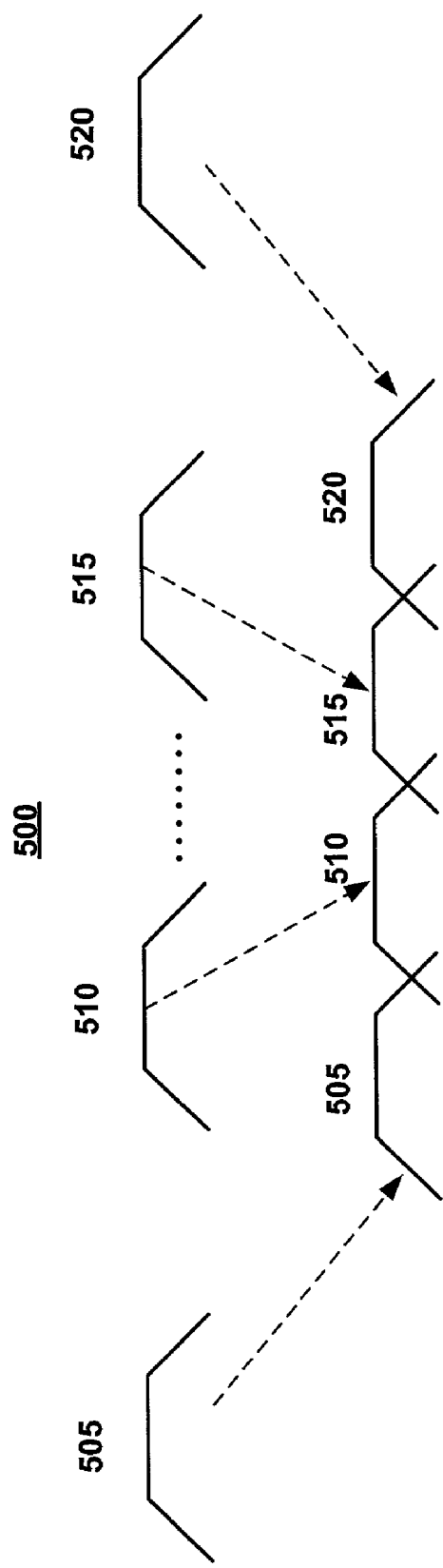
FIG. 5 is a representation of a pitch period overlapping process.

FIG. 5 illustrates a preferred method for streaming the signals, as implemented by the decoder 108 (FIG. 2). FIG. 5 illustrates a bit stream 500 in four exemplary pitch periods 505, 510, 515, 520. The decoder 108 concatenates the pitch periods in a single stream such that contiguous pitch periods overlap, to generate a smoother transition and improved audio quality.

A further implementation of the following invention can be applied when streaming a sub-frame of a possibly large frame video. Large video frames have been introduced for daily applications by high resolution video standards such as High Definition Television (HDTV) and MPEG-2, and by new cameras and optical devices that can provide inexpensive panoramic views. These views can be used for surveillance, video conferencing, monitoring, video games, and so forth.

Since the frames in these video frames can be quite large, that is several times larger than standard video streaming formats, the user may want to view a thumbnail of the entire panoramic view first. Alternatively, the user may wish to zoom in, or focus on a specific part of the picture, to view it in a larger or in full size. One way to achieve this objective is by streaming the entire panorama and then displaying the desired subframes. However, this method has the disadvantage of requiring a large amount of bandwidth to transfer the entire frame.

Another method is to inform the server of the desired picture part to be streamed. The server would then encode the reduced image, and submits it to the user. This method has the disadvantage of having the server encode different streams for each user, when several users are connected concurrently to the server, and each user is interested in a different part of the image.

It would therefore be desirable to provide the user with added control over the selective viewing of the frames or parts thereof, without excessive bandwidth requirement, while enabling concurrent use by several viewers or clients and avoiding large overhead on the server.

A feature of the present invention is to precompute as much of the signal as possible. When the user requests an audio signal change, or a portion of a panoramic image, all but the final audio or image processing work is done so the new media can be presented to the user with minimal network and compression load.

Figure 6:
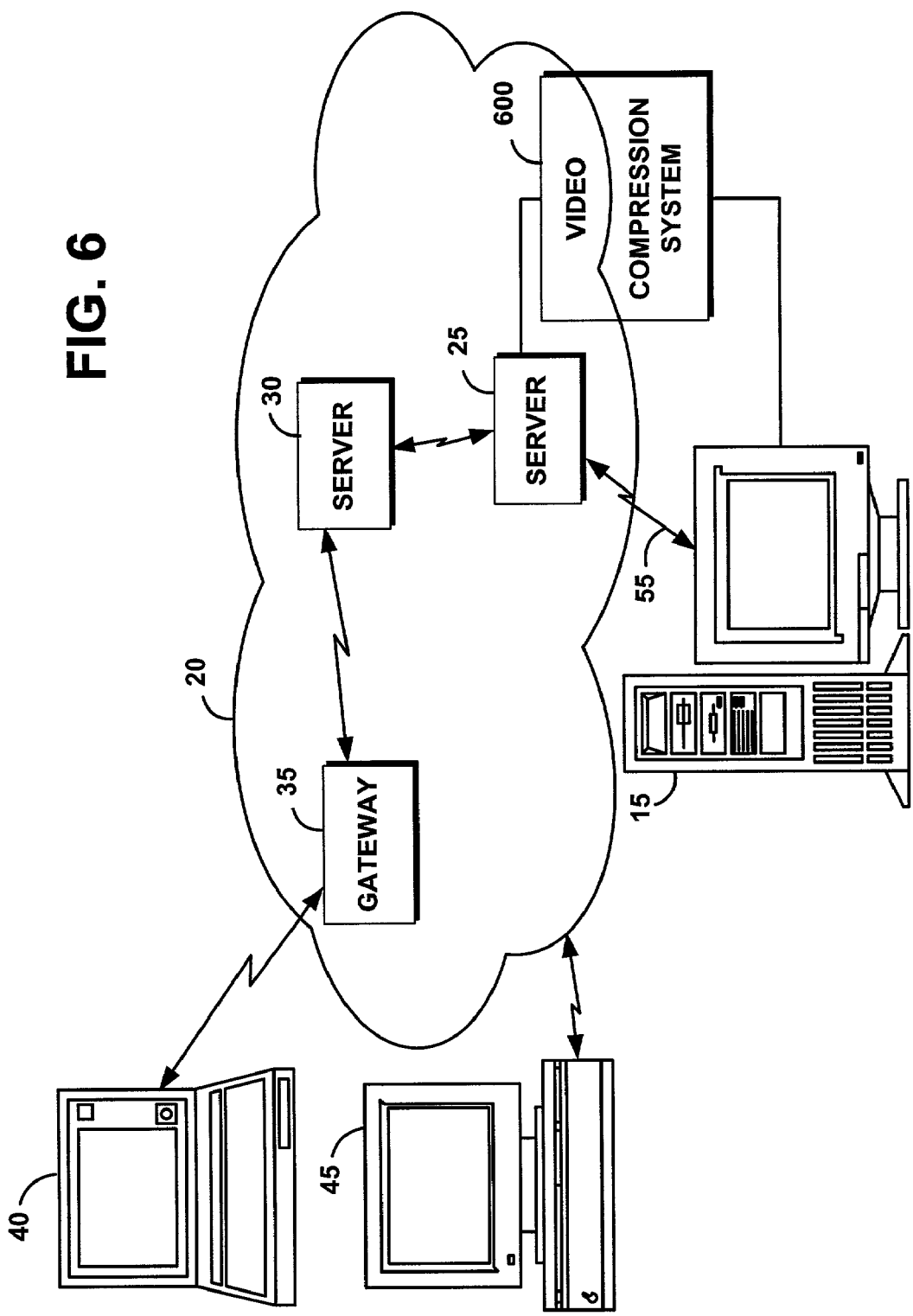
FIG. 6 is a schematic illustration of an exemplary operating environment in which a video sub-image compression system may be used according to the present invention.
Figure 7:
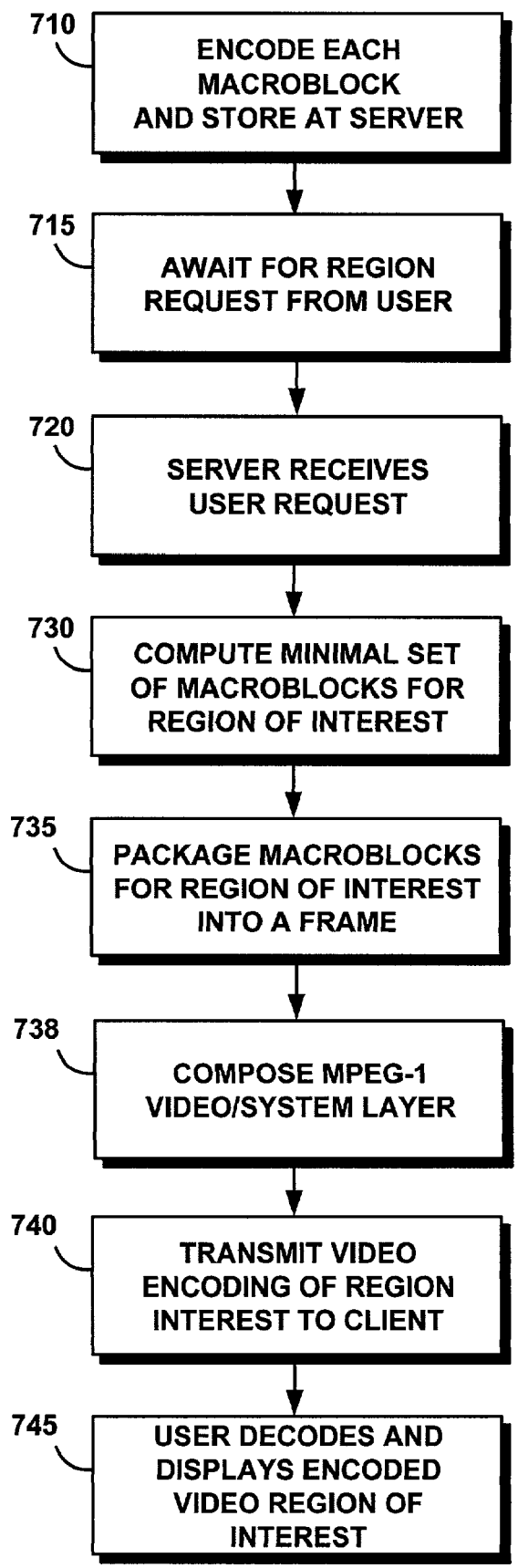
FIG. 7 is a process flow chart illustrating a method implemented by the video compression system of FIG. 6.

With reference to FIGS. 6 and 7, the present invention further provides a video compression system 600 and associated method 700, that separate the compression process into two parts. One part is implemented on the client end server 15 in preprocessing and is stored in the storage device. The other part is implemented on the server 25 at streaming time, as the user request for sub-frame is received. The compression system 600 encodes the entire image (i.e., input signal) once, and then stores the results at the macroblock level at the server. Then, depending on the user's region of interest, a minimal set of macroblocks is chosen, and a slice layer, a sequence layer, a picture layer and a group of pictures (GOP) layer are formed. A MPEG-1 stream is then formed and transmitted to the client. MPEG-1 Video Layer compression format will be used herein to describe the method of the present invention, with the understanding that other streaming formats can alternatively be used.

The MPEG-1 video standard defines three different types of frames: Intra-coded frames (I frames), Predicted frames (P frames), and Bidirectionally predicted frames (B frames). P and B frames are also said to be inter-coded because they are coded based on prior anchor or reference frames. Details of the MPEG-1 standard can be found in "ISO/IEC JTC1 CD 11172 Coding of moving pictures and associated audio for digital storage media up to 1.5 Mbits/s, 1992".

The I frames are compressed using intraframe coding, i.e., they do not reference any other frames in the coded stream. Each I frame is divided into 8×8-pixel blocks (typically 1200) and a Discrete Cosine Transform (DCT) is taken. Of the 64 DCT coefficients, the average Direct Current (DC), AC0,1 and AC1,0 low frequency components are of particular interest.

Predicted frames are coded using a motion compensation information from nearby I frames or P frames. B frames are coded using motion compensation information from either past and/or future I or P frames. P and B frames can also contain intra-coded blocks, which are also coded using DCT as are the blocks in the I frames.

An MPEG-1 bit stream has a hierarchical representation with six layers: a sequence layer, a group of pictures layer, a picture layer, a slice layer, a macroblock layer, and a block layer. The sequence layer is the top coding layer. A group of pictures layer (GOP) is a set of pictures in contiguous display order. It contains at least one I frame. Each picture corresponds to a frame. Each picture is divided into slices. A slice is divided into macroblocks. A macroblock is composed of 6 blocks: four blocks for luminance, and two for chrominances.

A DC image is composed of block-wise averages of 8×8 blocks. For the I-frame of an MPEG-1 coded video, each pixel in the DC image corresponds to a scaled version of the DC coefficient of each DCT block. The relation of inter-coded Pref with respect to Pi is derived in "Manipulation and compositing of MC-DCT compressed video," (by S. F. Chang and D. G. Messerschmitt, IEEE Journal on Selected Areas in Communications: Special Issue on Intelligent Signal Processing, vol. 13, pp. 1-11, January 1995). If we represent each block as an 8×8 matrix, then we can describe in the spatial domain through matrix multiplications:

The use of discrete cosine (DC) images extracted directly from MPEG-1 video has led to efficient algorithms for processing MPEG-1 video. Reference is made for example to "Rapid scene analysis on compressed videos" (by B. L. Yeo and B. Liu, IEEE Transactions on Circuits and Systems For Video Technology, vol. 5, pp. 533-544, December 1995) and "Efficient Matching and Clustering of Video Shots" (by M. M. Yeung and B. Liu, International Conference on Image Processing, Vol. 1, pp. 338-341, 1995).

Figure 8:
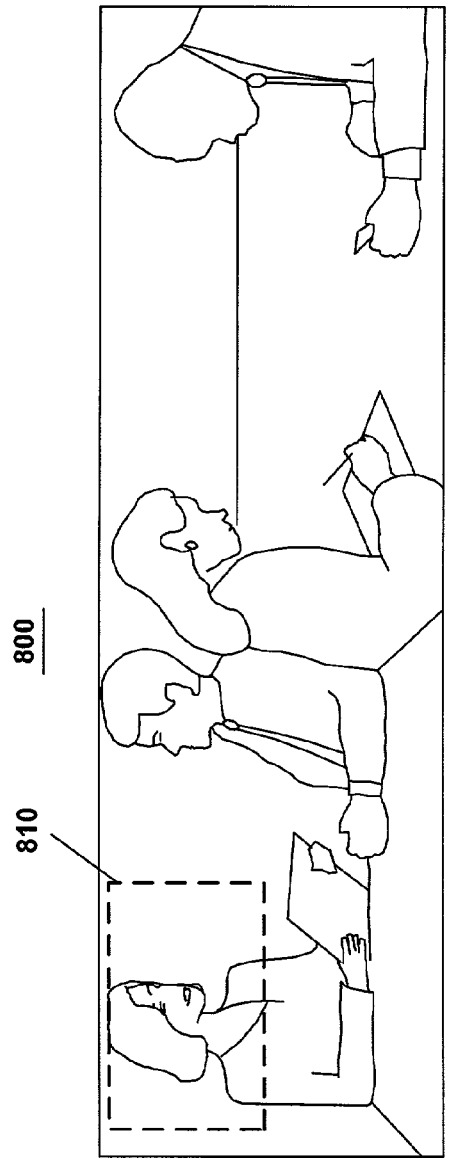
FIG. 8 illustrates an exemplary thumbnail of a wide frame, high resolution representation of a panoramic view to be processed by the video compression system and associated method of FIGS. 6 and 7.

The video compression system 600 and associated method 700 will now be described in connection with FIGS. 7 through 13. FIG. 8 illustrates a thumbnail of a wide frame 800, high resolution representation of a panoramic view provided here as one compelling example for the use of sub-frame selection. A typical region of interest 810 is shown enclosed in a dotted rectangle. Other examples for sub-frame selection include, but are not limited to, selection of the face of a speaking person from a high resolution video showing several people in the frame, or selection of one region from a surveillance camera.

Figure 9:
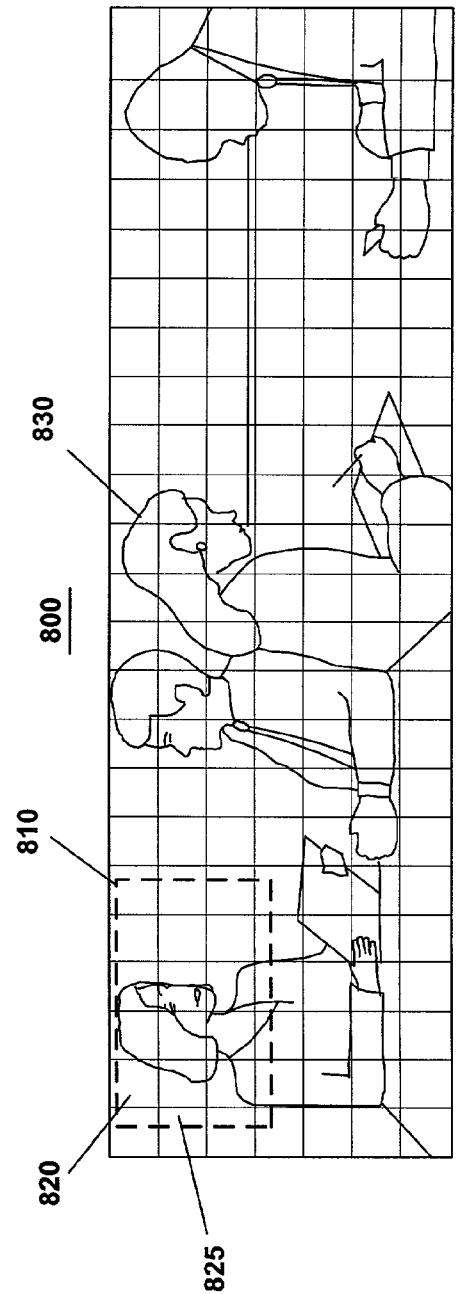
FIG. 9 illustrates the panoramic view and a user selected region of interest, at the MPEG macroblock level.
Figure 12:
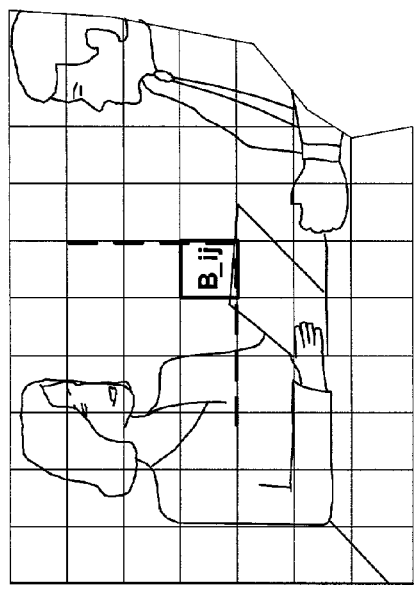
FIGS. 10-13 represent a sequence of four pre-computed encodings for each macroblock of the panoramic view, with four different motion vectors, each in a different quadrant: upper-left, upper-right, lower-left, lower-right quadrants, respectively.

FIG. 9 shows the same wide frame 800 including the region of interest 810 of FIG. 8, and illustrates the MPEG macroblock level. The macroblocks, e.g., 820, 825, 830 are illustrated as contiguous squares. The blocks are not drawn to scale, but are shown magnified for clarity of illustration.

Process 700 (FIG. 7) starts at block 710 by encoding the individual macroblocks for the entire image, i.e., the wide frame 800 of FIGS. 8 and 9, once, at the server 15. This is applied to each video frame. The encoded macroblocks are then stored at the macroblocks level at the server 15. This step includes most of the computational complexity of encoding MPEG-1 video, including color conversions, motion estimation, DCT, quantization, and run length code encoding. It does not include the packaging layers of frame, GOP and system layers. This is an intermediate representation of the video. Frame SMPTE and other higher level information is stored as well. SMPTE is a video time code standard set by the Society of Motion Picture and Television Engineers.

The server 15 then awaits for a request from the user at block 715. Upon receiving a user request at block 720 requesting a specific region of interest, 810 for example, the server 15 computes the minimal set of macroblocks that contains the region of interest 810, at block 730. The selected set of macroblocks includes, not only the macroblocks (i.e., 83) that are located completely with the region of interest 810, but also the macroblocks (i.e., 820, 825) that intersect the region of interest 810.

The system 600 (FIG. 6) then packages the region of interest 810, at block 735, into a frame layer representation, and proceeds with composing the higher layers unto an MPEG-1 video which includes the region of interest. It then transmits the encoded stream to the user, at block 740. The user then receives the encoded stream, for example in a MPEG-1 stream format, and decodes it for viewing or further processing (block 745 of FIG. 7). This process involves a minimal amount of computation and can be easily done on the server while streaming the result with a minimal delay to the user.

To encode the region of interest (block 735), the system 10 composes, for example, a slice layer from the corresponding macroblocks, packages them into a picture, GOP, and sequence layers, to generate a MPEG-1 stream. As at block 710, this step is applied to each video frame.

The macroblocks on the edge of the transmitted subframe do not use the motion compensation vectors that are pointing out of the region of interest. The macroblocks can be encoded in one of the following ways to address this problem.

1) The macroblocks can be encoded without motion vectors. This will introduce artifacts at the borders of the frame, but will not break the decoding system 10.

2) Encode each macroblock twice, once with a motion vector, and once without it. For macroblocks that contain motion vectors that go out of the transmitted subframe, do not use the motion vector. For the remaining vectors, the system 10 uses the optimal motion vector. The system 10 transmits motion vectors only if the source falls within the region of interest 810.

Figure 13:
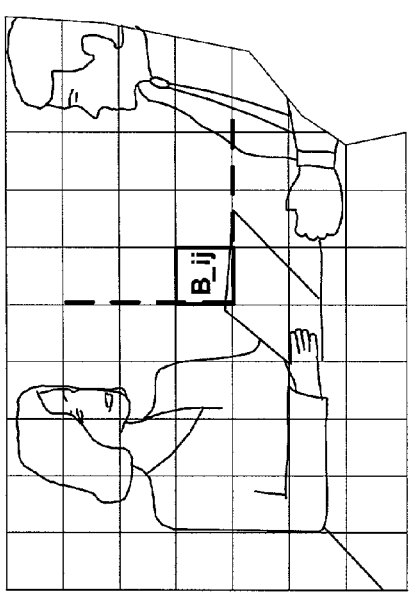
Figure 10:
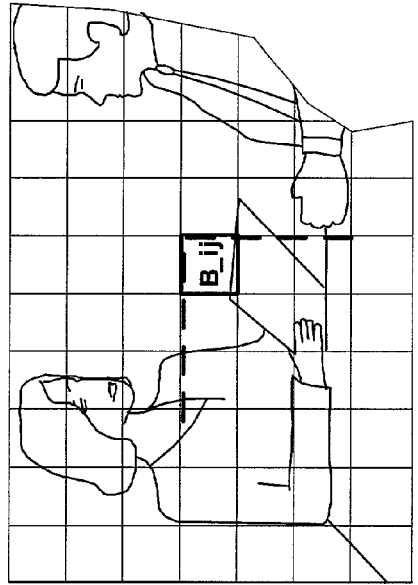
Figure 11:
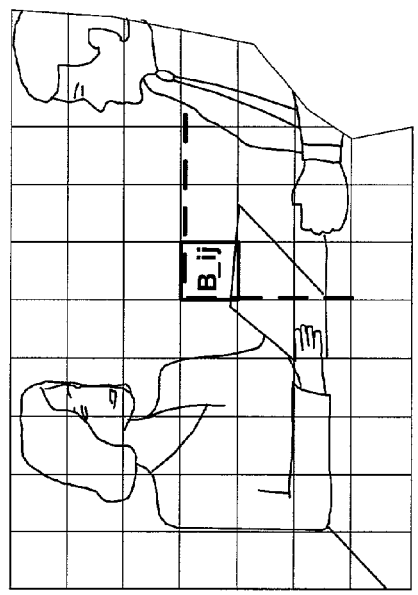

3) As illustrated in FIGS. 10 through 13, the system 10 encodes each macroblock four times with four different motion vectors, wherein for each potential region of interest that includes the macroblock the motion is constrained to only one quadrant: upper-left encoding (FIG. 10), upper-right encoding (FIG. 11), lower-left encoding (FIG. 12), lower-right encoding (FIG. 13). The system 10 selects the best encoded form among those that are inside the streamed subframe.

For example, if the macroblock is not on the border of the region of interest but is surrounded by blocks which are all being transmitted, then the best of its four representations would be the optimal coding for it in a regular system. However, if the block is on the border of the region, then the best possible coding for it will be found among the one (for a corner block) or two (for an edge block) quadrants which overlap with the region of interest. This method is expected to yield the best results in terms of image quality and compression efficiency. However it requires up to four times the amount of storage required by a single MPEG representation.

While detailed descriptions of specific embodiments of the present invention have been provided for the case of audio speedup and for the case of sub-frame MPEG coding, it would be apparent to those reasonably skilled in the art that numerous variations are possible in which the concepts of the present invention may readily be applied. The descriptions provided herein are for the sake of illustration and are not intended to be exclusive.

What is claimed is:

1. A processor-implemented method of modifying an input media signal stored on a server for playback on a client in a streaming environment according to a client-specified parameter, comprising:

using a stream processing algorithm to perform a first stage of computation on the input media signal, once, at the server, to generate an intermediate representation of the input media signal, independent of the client-specified parameter; the first stage of computation including a time scale modification of the input media signal using a time-to-frequency mapping of the input media signal to generate a plurality of samples comprising the intermediate representation;

wherein the time scale modification of the input media signal comprises:

calculating a filter bank representation of the input media signal, the filter bank representation producing sub-band output streams of the input media signal;

computing a psychoacoustic model to determine a mastery level of the input media signal as a function of time and frequency, to determine a number of bits to allocate to the sub-band output streams, and to predict an amount of quantization noise in frequency bands of the input media signal that is masked by the signal content, thereby maintaining a perceived quality of the input media signal for the number of bits allocated to the sub-band output streams to encode the input media signal, the psychoacoustic model being based on a subjective and psychological perception of the input media signal;

tabulating the number of bits allocated to the sub-band output streams;

computing pitch of the input media signal;

quantizing the filter bank representation of the input media signal from the psychoacoustic model, wherein the psychoacoustic model is stored as part of the intermediate representation;

dropping a portion of the plurality of samples comprising the intermediate representation, wherein dropping the portion of the plurality of samples is determined by a speed factor request from a client;

wherein the intermediate representation requires a second stage of computation in order to provide partial processing for playback on the client, the second stage of computation being implemented by the stream processing algorithm receiving a client-specified parameter subsequent to generation of the intermediate representation;

storing the intermediate representation of the input media signal;

using the stream processing algorithm to perform the second stage of computation on the intermediate representation to generate a modified media signal for providing partial processing for playback on a client based on the client-specified parameter; and performing a third stage of computation for implementing a final processing of the modified media signal.

2. The method of claim 1, wherein the server generates, at least in part, the modified media signal of the input media signal.

3. The method of claim 1, wherein the client generates, at least in part, the modified media signal of the input media signal.

4. The method of claim 2, wherein the client further generates the modified media signal of the input media signal.

5. The method of claim 1, further comprising sending at least in part, the intermediate representation to the client for further processing based on the client-specified parameter.

6. The method of claim 5, further comprising sending at least in part, the intermediate representation to the server for further processing based on the client-specified parameter.

7. The method of claim 1, further comprising sending at least in part, the intermediate representation to the server for further processing based on the client-specified parameter.

8. The method of claim 5, further comprising sending the intermediate representation to the server for further processing based on the client-specified parameter.

9. The method of claim 1, wherein storing the intermediate representation of the input media signal comprising storing the intermediate representation in a storage device.

10. The method of claim 9, wherein storing the intermediate representation in a storage device comprises storing the intermediate representation on a disk drive.

11. The method of claim 1, wherein storing the intermediate representation of the input media signal comprising storing the intermediate representation in a memory device.

12. The method of claim 1, wherein the client-specified parameter indicates an increase in a playback rate.

13. The method of claim 1, wherein the client-specified parameter indicates a reduction in a playback rate.

14. The method of claim 1, wherein the input media signal comprises an input audio signal; and wherein performing the first stage of computation on the input media signal comprises computing a pitch of the input audio signal.

15. The method of claim 14, further comprising formatting an output media signal for streaming.

16. The method of claim 15, wherein formatting the output media signal comprises overlapping successive pitch periods.

17. The method of claim 1, wherein the input media signal comprises an audio signal component.

18. The method of claim 1, wherein the input media signal comprises a video signal component.

19. The method of claim 1, wherein performing the first stage of computation on the input media signal comprises computing pitch information of the input media signal using auto correlation.

20. The method of claim 1, further comprising storing the pitch information of the input media signal as part of the intermediate file.

21. The method of claim 1, further comprising implementing reverse speech playback.

22. The method of claim 18, further comprising speeding up a slide show.

23. The method of claim 1, wherein performing the first stage of computation on the input media signal comprises performing pre-computations on a hardware device.

24. The method of claim 23, wherein performing pre-computations on the hardware device comprises using an encoder chip.

25. The method of claim 24, wherein using the encoder chip comprises using an MPEG encoder chip.

26. The method of claim 1, wherein performing the second stage of computation on the intermediate representation comprises creating a secondary intermediate representation of the input media signal.

27. The method of claim 26, further comprising performing a third stage of computation on the secondary intermediate representation to generate the modified media signal.

28. A non-transitory computer usable medium having a plurality of executable instruction codes for modifying an input media signal stored on a server for playback on a client in a streaming environment according to a client-specified parameter, comprising:

a stream processing algorithm including a set of instruction codes for performing a first stage of computation on the input media signal, once, at the server, to generate an intermediate representation of the input media signal, independent of the client-specified parameter; the first stage of computation including a time scale modification of the input media signal using a time- to-frequency mapping of the input media signal to generate a plurality of samples comprising the intermediate representation;

wherein the time scale modification of the input media signal comprises:

calculating a filter bank representation of the input media signal, the filter bank representation producing sub-band output streams of the input media signal;

computing a psychoacoustic model to determine a mastery level of the input media signal as a function of time and frequency, to determine a number of bits to allocate to the sub-band output streams, and to predict an amount of quantization noise in frequency bands of the input media signal that is masked by the signal content, thereby maintaining a perceived quality of the input media signal for the number of bits allocated to the sub-band output streams to encode the input media signal, the psychoacoustic model being based on a subjective and psychological perception of the input media signal;

tabulating the number of bits allocated to the sub-band output streams;

computing pitch of the input media signal;

quantizing the filter bank representation of the input media signal from the psychoacoustic model, wherein the psychoacoustic model is stored as part of the intermediate representation;

dropping a portion of the plurality of samples comprising the intermediate representation, wherein dropping the portion of the plurality of samples is determined by a speed factor request from a client;

wherein the intermediate representation requires a second stage of computation in order to provide playback on the client, the second stage of computation being implemented by the stream processing algorithm receiving a client-specified parameter subsequent to generation of the intermediate representation;

a set of instruction codes for storing the intermediate representation of the input media signal; and the stream processing algorithm including a set of instruction codes for performing the second stage of computation on the intermediate representation to generate a modified media signal for providing playback on a client based on the client-specified parameter.

* * * * *